United States Patent [19]
Jennings

[11] Patent Number: 4,944,583
[45] Date of Patent: Jul. 31, 1990

[54] EYEGLASS SHADING DEVICE

[76] Inventor: Matthew G. Jennings, 1820 Monte Vista La., Moses Lake, Wash. 98837

[21] Appl. No.: 323,801

[22] Filed: Mar. 15, 1989

[51] Int. Cl.$^5$ .............................................. G02C 7/16
[52] U.S. Cl. ......................................... 351/45; 351/47
[58] Field of Search ...................... 351/45, 47, 48, 44; 2/13

[56] References Cited
U.S. PATENT DOCUMENTS
2,858,539 11/1958 Carlson ..................................... 2/13
4,698,022 10/1987 Gilson ..................................... 351/47

Primary Examiner—Rodney B. Bovernick

[57] ABSTRACT

An auxiliary eye protection assembly made up of a left and right side, adapted to clip on to or be made a part of spectacles, pivotal to any position in front of, below, or above the eyes, allowing unhindered viewing of the surrounding area by the sunlight, lights, their reflective rays, man made or natural. This invention is also for the use of advertisement and spectacle stands, holding the eyeglasses up off the resting surface whether it is sand, grass, pavement, etc.

1 Claim, 3 Drawing Sheets

EYEGLASS SHADING DEVICE

BACKGROUND OF THE INVENTION

This invention relates to an eye protection assembly designed to be removably attached to and supported by, or made part of a pair of spectacles or eyeglasses. This invention is designed to be pivotal, and hold in any position from the forehead to the cheek bone, as shown in FIGS. #2 and 4, thus blocking the sunlight, lights, their reflective rays, man made or natural, at any angle.

For years people have used their hands, or hand held objects, to block the sun at whatever angle it may be, which a stationary visor placed on the head cannot do. This is inconvenient, as well as tiresome and uncomfortable.

Accordingly, it is the object of this invention to provide shading to the eyes from the sun or other lights, at any angle, with maximum comfort and ease.

It is another object of the invention to provide a vehicle for advertisement, intentionally designed to exhibit logo, signature, product profile, picture, or design.

It is still another object of the invention to provide adjustable shading to the eyes, with the invention being clipped to the arm of the eyeglasses with a clip element that is adjustable to fit a greater than usual variety of spectacle frames, and has improved holding characteristics.

It is still a further object of the invention to provide a pair of auxiliary shading components for spectacles, which are formed of a minimum number of parts, simple to manufacture, and easily assembled.

It is still another object of the invention to hold eyeglasses above their resting surface, sand, grass, dirt, etc., by easily pivoting to a position that the invention cradles eyeglasses as seen in FIG. #3.

Other objects and advantages of the invention will become apparent from the following description, when taken in conjunction with the accompanying figures and pictures.

BRIEF DESCRIPTION OF THE DRAWINGS

FIG. #1 is a perspective view of the principle elements of the assembly, separated in space to illustrate them more clearly,.

FIGS. #2, 3, & 4, are views showing TOTAL-EYE-CLIPS in position of use on a pair of spectacles.

Figure 1:
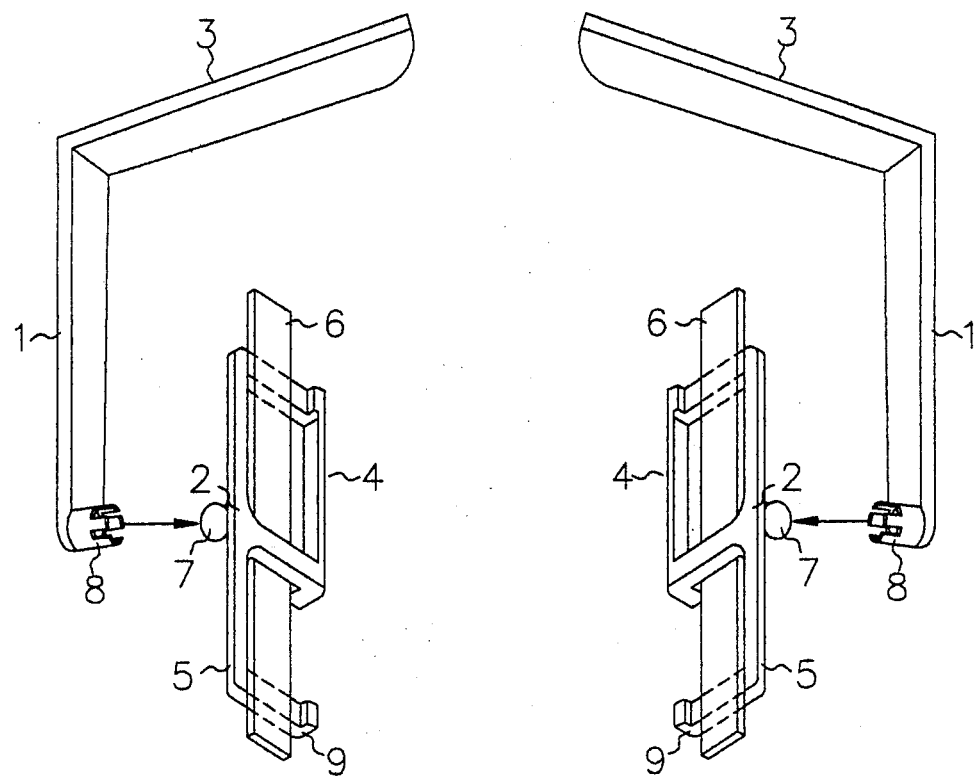
Figure 2:
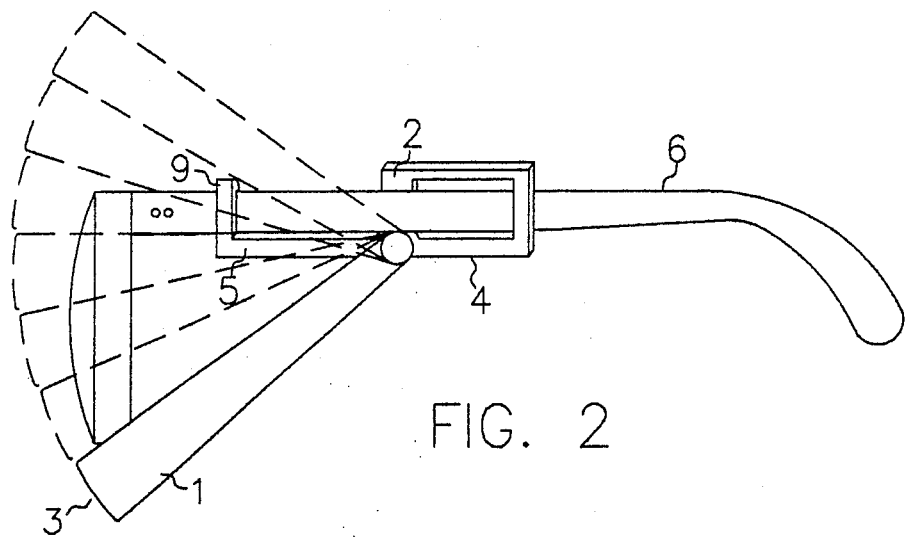
Figure 3:
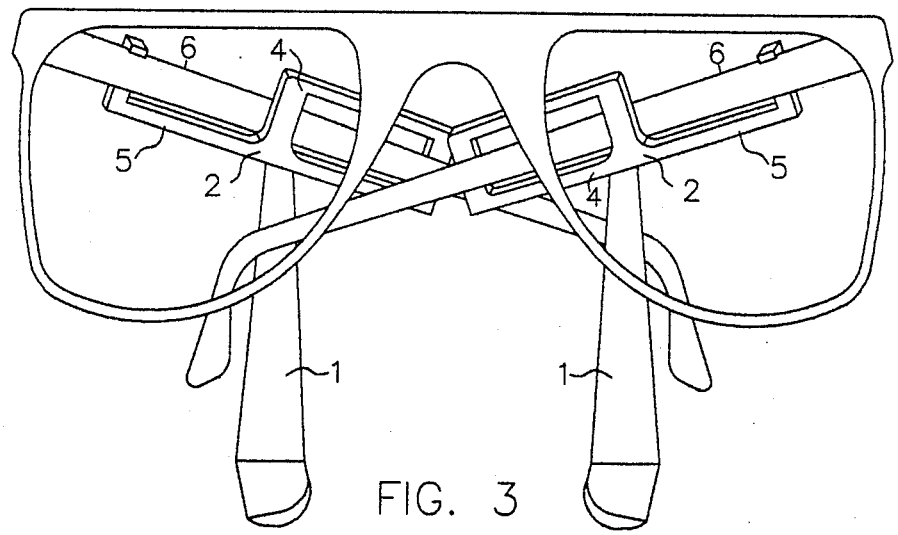
Figure 4:
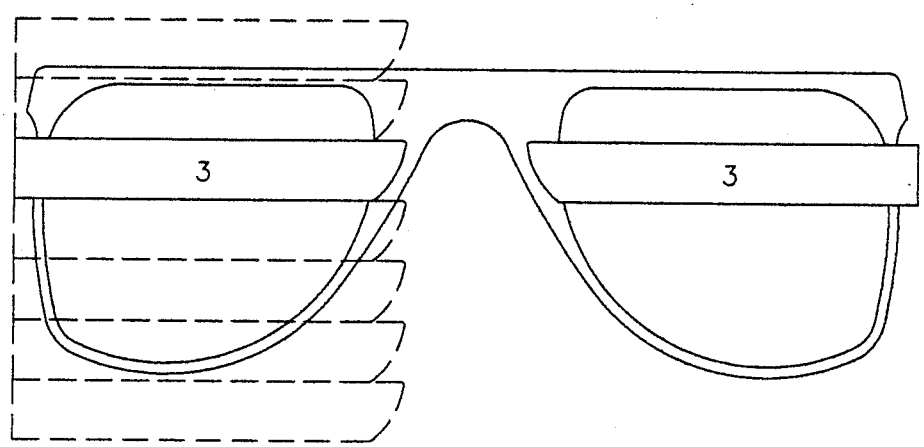

FIG. #4 is a front view of FIG. #2, showing motion in which TOTAL-EYE-CLIPS may stop at any angle and stay firmly in position.

FIG. #2 is a side view of FIG. #4 showing motion in which TOTAL-EYE-CLIPS may stop at any angle and stay firmly in position. Referring more particularly to the drawings where in like reference numerals designate like parts throughout the several views.

DETAILED DESCRIPTION

Number 2 throughout the views is the clip element, which attaches TOTAL-EYE-CLIPS to the arm, #6, of the eyeglasses. Said clip, #2, is comprises of a closed shape, #4, with one or more elongated sides; such as a triangle, oval, square, rectangle, etc., with an extending "L" shaped tail, #5, and #9. The tail comprising of a horizontal elongated member, #5, joined at the end to elongated, vertical member, #9.

Number 3 throughout the views is the vertical face of the extension on which advertisement, logo, signature, picture, or design can be displayed, or the product profile can be formed. It is also the portion which is to be placed between the wearer's eyes and the sunlight, lights, their reflective rays, man made or natural, in order to permit unhindered viewing of the surrounding area.

Number 1 throughout the views is the extension, extending from the ear piece of the eyeglasses, around to the center of the wearer's face. Number 1 runs on a horizontal plane, with a vertical face, #3, designed specifically for advertisement, logo, signature, picture, design, or the product profile.

Number 7 is a ball formed on the side of said clip, #2; a receptacle, #8, is formed on the end of said extension, #1. Number 8 consists of two or more sides that expand and encapsulate the ball, #7, when mated together.

I claim:

1. A shading device for attachment to a pair of eyeglasses, the device comprising an elongated shading member, a second elongated member extending rearwardly from said shading member, said second elongated member having a receptacle attached to the end distant from said shading member, said receptacle consisting of a plurality of expandable sides, said device further comprising a clip element having a shaped portion with an opening through which the temple of a pair of eyeglasses may pass, and said clip further having a tail section in the form of an L extending from said shaped portion for supporting the clip against the temple, said clip further including a ball element being sized for providing a rotatable connection to the receptacle; whereby, when said device is attached to a pair of eyeglasses, an adjustable eye shade is provided.

* * * * *